United States Patent
Fukuda et al.

(10) Patent No.: US 9,769,298 B2
(45) Date of Patent: *Sep. 19, 2017

(54) CORDLESS PHONE APPARATUS, CORDLESS PHONE SYSTEM, AND METHOD FOR TRANSFERRING DATA

(71) Applicant: Panasonic Intellectual Property Management Co., Ltd., Osaka (JP)

(72) Inventors: Hikaru Fukuda, Fukuoka (JP); Eiichi Hatae, Fukuoka (JP); Satoshi Ando, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/122,383

(22) PCT Filed: Mar. 3, 2015

(86) PCT No.: PCT/JP2015/001095
§ 371 (c)(1),
(2) Date: Aug. 29, 2016

(87) PCT Pub. No.: WO2015/133120
PCT Pub. Date: Sep. 11, 2015

(65) Prior Publication Data
US 2017/0078467 A1    Mar. 16, 2017

(30) Foreign Application Priority Data
Mar. 7, 2014 (JP) .................................. 2014-045289

(51) Int. Cl.
*H04M 1/00* (2006.01)
*H04B 7/00* (2006.01)
(Continued)

(52) U.S. Cl.
CPC ....... *H04M 1/725* (2013.01); *H04M 1/72502* (2013.01); *H04M 1/72513* (2013.01);
(Continued)

(58) Field of Classification Search
CPC ....................................................... H04M 1/725
(Continued)

(56) References Cited

U.S. PATENT DOCUMENTS 5,768,601 A * 6/1998 Tran ........................ H03F 1/305
330/297
8,380,183 B2 2/2013 Misumi et al.
(Continued)

FOREIGN PATENT DOCUMENTS

EP    2 833 608 A1    2/2015
EP    3 116 201 A1    1/2017
(Continued)

OTHER PUBLICATIONS

International Search Report dated Mar. 31, 2015, for corresponding International Application No. PCT/JP2015/001095, 3 pages.
(Continued)

*Primary Examiner* — Tilahun B Gesesse
(74) *Attorney, Agent, or Firm* — Seed IP Law Group LLP

(57) ABSTRACT

A cordless phone apparatus is provided, which includes one or more slave devices and a master device. The master device includes: i) a LAN transmitter configured to transmit slave device information to a wireless IP terminal via a wireless LAN, wherein the slave device information includes identification information of each slave device registered to the master device, ii) a receiver configured to receive from the wireless IP terminal selection of the identification information of a destination slave device and selection of transfer data including at least one of ringtone data, wallpaper data, and phone book data, iii) a transfer data
(Continued)

converter configured to convert at least one of the ringtone data, wallpaper data, and phone book data included in the transfer data into a data format usable in the destination slave device, and iv) a cordless phone transmitter configured to transmit the converted transfer data to the destination slave device.

20 Claims, 11 Drawing Sheets

(51) Int. Cl.
    *H04M 1/725*     (2006.01)
    *H04W 84/12*     (2009.01)
    *H04W 88/06*     (2009.01)

(52) U.S. Cl.
    CPC ........ *H04M 2250/64* (2013.01); *H04W 84/12* (2013.01); *H04W 88/06* (2013.01)

(58) Field of Classification Search
    USPC .................... 455/552.1, 552.2, 556.1, 557
    See application file for complete search history.

(56) References Cited

U.S. PATENT DOCUMENTS

| | | |
|---|---|---|
| 2007/0025531 A1 | 2/2007 | Lin |
| 2009/0161602 A1* | 6/2009 | Matsumoto ....... H04W 72/1242 370/328 |
| 2011/0244849 A1 | 10/2011 | Misumi et al. |
| 2012/0044855 A1* | 2/2012 | Lampe ................. H04W 28/06 370/312 |
| 2013/0202301 A1* | 8/2013 | Ago ................... H05B 37/0245 398/58 |
| 2015/0036671 A1 | 2/2015 | Fukuda et al. |

FOREIGN PATENT DOCUMENTS

| | | |
|---|---|---|
| JP | 05-308669 A | 11/1993 |
| JP | 2001-358799 A | 12/2001 |
| JP | 2003-101632 A | 4/2003 |
| JP | 2003-348254 A | 12/2003 |
| JP | 2004-260538 A | 9/2004 |
| JP | 3116750 U | 12/2005 |
| JP | 2006-025368 A | 1/2006 |
| JP | 2008-147975 A | 6/2008 |
| JP | 2010-226570 A | 10/2010 |
| JP | 2011-217063 A | 10/2011 |
| JP | 2012-213049 A | 11/2012 |
| JP | 5458209 B1 | 4/2014 |

OTHER PUBLICATIONS

Extended European Search Report dated May 3, 2017, for corresponding European Application No. 15758598.5 1972 / 3116201, 14 pages.
Panasonic System Networks Co. et al., "Smartphone Connect App Guide, Premium Design Phone with Smartphone Connect," Model No. KX-PRW110; KX-PRW120, Jan. 1, 2013, 24 pages.
Extended European Search Report, dated Jun. 19, 2017, for corresponding European Application No. 15768288.1-1972/3125511, 11 pages.

\* cited by examiner

FIG. 3A

| | CONNECTION STATE | SLAVE DEVICE NAME | SLAVE DEVICE NUMBER | WALLPAPER DATA INFORMATION | THUMBNAIL DATA INFORMATION | USE CODEC | RINGTONE MEMORY INFORMATION |
|---|---|---|---|---|---|---|---|
| SLAVE DEVICE 1 | REGISTERED (CONNECTED) | Living room | 11 | 16 COLOR BMP VERTICAL x HORIZONTAL 320 x 240 PIXEL | 16 COLOR BMP VERTICAL x HORIZONTAL 72 x 72 PIXEL | G.722 | 500k BYTE |
| SLAVE DEVICE 2 | REGISTERED (CONNECTED) | Kitchen | 12 | 16 COLOR BMP VERTICAL x HORIZONTAL 264 x 240 PIXEL | 16 COLOR BMP VERTICAL x HORIZONTAL 72 x 72 PIXEL | G.722 | 500k BYTE |
| SLAVE DEVICE 3 | REGISTERED (OUTSIDE RANGE) | Bed room1 | 13 | 256 COLOR BMP VERTICAL x HORIZONTAL 320 x 240 PIXEL | 16 COLOR BMP VERTICAL x HORIZONTAL 92 x 92 PIXEL | G.722 | 1M BYTE |
| SLAVE DEVICE 4 | REGISTERED (CONNECTED) | Bed room2 | 14 | 256 COLOR BMP VERTICAL x HORIZONTAL 320 x 240 PIXEL | 16 COLOR BMP VERTICAL x HORIZONTAL 92 x 92 PIXEL | G.722 | 1M BYTE |
| SLAVE DEVICE 5 | REGISTERED (OUTSIDE RANGE) | Garage | 15 | NO DISPLAY CAPABILITY | NO DISPLAY CAPABILITY | G.711 | 500k BYTE |
| SLAVE DEVICE 6 | — (UNREGISTERED) | — | — | — | — | — | |

| WALLPAPER DATA INFORMATION | THUMBNAIL DATA INFORMATION | USE CODEC | RINGTONE MEMORY INFORMATION |
|---|---|---|---|
| 16 COLOR BMP VERTICAL x HORIZONTAL 320 x 240 PIXEL | 16 COLOR BMP VERTICAL x HORIZONTAL 72 x 72 PIXEL | G.722 | 500K BYTE |

CORDLESS PHONE APPARATUS, CORDLESS PHONE SYSTEM, AND METHOD FOR TRANSFERRING DATA

TECHNICAL FIELD

The present disclosure relates to a cordless phone apparatus which is wirelessly connected to a mobile phone having a wireless LAN communication unit, a cordless phone system including the cordless phone apparatus, and a method for transferring data which is used in the cordless phone apparatus and the cordless phone system.

RELATED ART

In recent years, a wireless LAN communication unit (a Wi-Fi (registered trademark) function of the IEEE.802.11 standard) is provided in a mobile phone (so-called, including a smart phone) to be connected to a mobile telephone network, and it is able to connect to the Internet in a wireless LAN environment of home or an office (hereinafter, referred to as "in home") using the mobile phone, and use various internet services such as Web browsing and IP phones.

It has become common for the user to freely customize ringtone and wallpaper data in the mobile phone, such as by using his favorite music as a ringtone, depending on his or her taste, or using image data captured by the camera of the mobile phone as the wall paper of the mobile phone.

However, in cordless phones used in homes, the user is only able to select and use ringtone and wallpaper data from among several pieces which are prepared in advance at the time of purchase.

For example, PTLs 1 and 2 disclose techniques in which a mobile phone is wirelessly connected to different phones such as a cordless phone slave device which is used in home (a codeless handset) and transfers various data (such as phone book data, wallpaper data, and ringtone data), saved in the mobile phone, to the different phones, in order to resolve the complaints of the user. It should be noted that the ringtone data may be sound source data used in the cordless phone slave device, such as holding tone and guidance messages of an answering machine.

In PTL 1, a phone is described which is coupled with an external storage device (such as a mobile phone) and reads audio files from the external storage device to be able to freely change a ringtone.

In PTL 2, a phone book data transfer system is described in which a mobile phone and an extension telephone (or a public switched telephone) are coupled and can transfer phone book data to each other.

CITATION LIST

Patent Literature

PTL 1: Japanese Registered Utility Model No. 3116750
PTL 2: Japanese Patent Unexamined Publication No. 2003-101632

SUMMARY

However, it is necessary to provide a host device controller (HDC) in the phone for coupling with the external storage device, in the cordless phone system described in PTL 1. Then, in a cordless phone apparatus in which a plurality of cordless phone slave devices and a master device are coupled, it becomes necessary to provide the HDC in each cordless phone slave device, and thus cost is increased.

When the external storage device of PTL 1 is a personal computer or a mobile phone, audio data which is recorded with these devices and saved therein has an audio format such as MPEG Audio Layer-3 (MP3) or a WAV format, and a CODEC of the cordless phone slave device cannot play the audio data back as it is. Since a CODEC which converts digital audio data of a PCM data format such as G.722 standard, or G.711 standard into analog audio is generally used in the cordless phone slave device, in a case where audio data of an MP3 or a WAV format is transmitted to the cordless phone slave device, the cordless phone slave device needs to convert the format of the audio data so as to be played back in the use CODEC. The execution of the conversion process becomes a factor inducing a processing capacity decrease and a cost increase in each cordless phone slave device.

Moreover, even in the phone system described in PTL 2, it is necessary to provide interface means for communicating directly with the cordless phone slave device and the mobile phone. The phone book data or the like of the mobile phone includes image data of a large capacity such as face photographs which are created according to the capacity of a high-precision liquid crystal display of the mobile phone in recent years in addition to the text data such as phone numbers and name information, and thus it is not able to display the image data as it is in the cordless phone slave device equipped with the liquid crystal device different from the mobile phone. In the mobile phone of high quality, image data (JPEG or the like) of an SVGA (800×600 pixels) or XGA (1024×768 pixels) is used. Meanwhile, QVGA (320× 240 pixels) or VGA (640×480 pixels) is used in a general cordless phone slave device. Therefore, in a case where the image data stored in the mobile phone is transmitted to the cordless phone slave device, it is necessary to re-size the image data to a viewable size on the liquid crystal display unit in the cordless phone slave device. The execution of the conversion process becomes a factor inducing a processing capacity decrease and a cost increase in each cordless phone slave device.

In both PTLs 1 and 2, data is not transmitted from a mobile phone through a cordless phone master device by designating a destination slave device, and it is not possible to meet the user's needs to transmit specific data only to a designated slave device.

An object of the present disclosure is to provide a cordless phone apparatus and a cordless phone system, in which the user of a mobile phone is able to store specific data which is stored in the mobile phone, in a designated cordless phone slave device, in a state of being available in the cordless phone slave device, without providing a new device in the cordless phone slave device.

A cordless phone apparatus according to an aspect of the present disclosure is a cordless phone apparatus which includes at least one or more slave devices and a master device, and transfers slave device transfer data including image data or music data, selected by a wireless IP terminal, to the slave devices, the wireless IP terminal being wirelessly connected to the master device through a wireless LAN, the master device is configured to include a slave device information transmitter that transmits slave device information to the wireless IP terminal, the slave device information including slave device identification information on each slave device which is registered in the master device, a slave device transfer data receiver that receives slave device transfer data including destination slave device information indicating slave device identification information on a destination slave device from the wireless IP terminal, and stores the slave device transfer data in a storage, a destination slave device determiner that determines a slave device which is a destination of the slave device transfer data, based on the destination slave device information, and a slave device transfer data transmitter that transmits the slave device transfer data to all of the destination slave devices which are extracted by the destination slave device determiner.

A cordless phone system according to another aspect of the present disclosure is a cordless phone system including a cordless phone apparatus which includes at least one or more slave devices and a master device, and a wireless IP terminal which is wirelessly connected to the master device of the cordless phone apparatus through a wireless LAN, and the wireless IP terminal is configured to include a slave device information receiver that receives from the master device, slave device information including slave device identification information on each slave device which is registered in the master device, and stores the slave device information in a first storage, a slave device transfer data selector that selects slave device transfer data to be transferred to the slave device, from among data stored in the first storage, a destination slave device selector that selects slave device which is a destination of the slave device transfer data from the slave device identification information included in the slave device information, and a slave device data transmitter that edits the slave device transfer data so as to include destination slave device information indicating slave device identification information of the slave device selected by the destination slave device selector, and transmits the edited slave device transfer data to the master device, and the master device is configured to include a slave device information transmitter that transmits the slave device information which is stored in a second storage, to the wireless IP terminal, a slave device transfer data receiver that receives slave device transfer data from the wireless IP terminal, and stores the slave device transfer data in the second storage, a destination slave device determiner that determines a destination slave device of the slave device transfer data, based on destination slave device information of slave device transfer data stored in the second storage, and a slave device transfer data transmitter that transmits the slave device transfer data to the destination slave device.

A method for transferring data of a cordless phone apparatus according to further another aspect of the present disclosure is a method for transferring data of a cordless phone apparatus which includes at least one or more slave devices and a master device, and transfers slave device transfer data including image data or music data, which is selected by a wireless IP terminal, to the slave devices, the wireless IP terminal being wirelessly connected to the master device through a wireless LAN, the master device executes: a slave device information transmitting step of transmitting slave device information to the wireless IP terminal, the slave device information including slave device identification information of the slave device which is registered in the master device; a slave device transfer data receiving step of receiving slave device transfer data including destination slave device information indicating slave device identification information on a destination slave device from the wireless IP terminal, and storing the slave device transfer data in a storage; a destination slave device determination step of determining a destination slave device of the slave device transfer data, based on the destination slave device information of slave device transfer data which is stored in the storage; and a slave device transfer data transmission step of transmitting the slave device transfer data to all of the destination slave devices which are extracted in the destination slave device determination step.

According to the present disclosure, since the slave device information that the cordless phone master device has is transferred to the mobile phone, the user of the mobile phone is able to store specific data which is stored in the mobile phone, based on slave device information, in a designated cordless phone slave device, in a state of being available in the cordless phone slave device, without providing a new device in the cordless phone slave device.

BRIEF DESCRIPTION OF DRAWINGS

FIG. 3A is a diagram illustrating an example of a slave device information table.

DETAILED DESCRIPTION

Hereinafter, the present disclosure will be described in detail, with reference to the drawings.

Exemplary Embodiment

Figure 1:
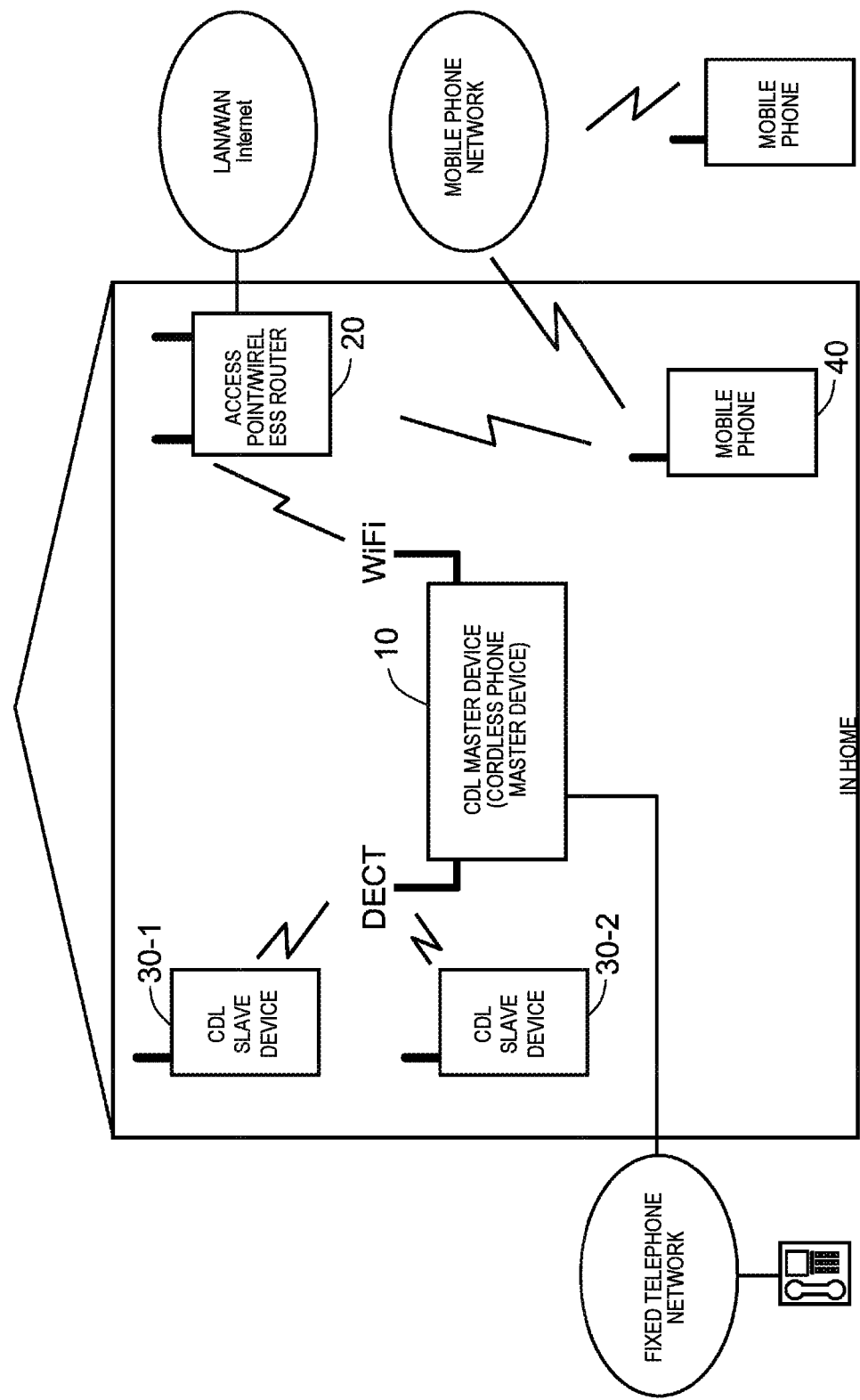
FIG. 1 is a schematic diagram illustrating a configuration of a cordless phone system according to an embodiment of the present disclosure.

FIG. 1 is a schematic diagram illustrating a configuration of a cordless phone system according to an exemplary embodiment of the present disclosure. Hereinafter, the configuration of the cordless phone system will be described with reference to FIG. 1. A wireless IP terminal is exemplified as a mobile phone including a smart phone in the following description, but the present disclosure is not limited thereto.

In FIG. 1, cordless phone master device 10 is provided in home, and cordless phone master device 10 is connected to the Internet through access point 20, while being connected to a fixed telephone network. There are cordless phone slave devices (CDL slave devices) 30-1 and 30-2 which are connected to cordless phone master device 10, access point 20 having a wireless LAN router function, and mobile phone 40 connected to a mobile phone network, in home. If there is no distinction particularly, cordless phone slave devices are generally referred to as cordless phone slave device 30.

In FIG. 1, cordless phone slave device 30 is connectable to a fixed telephone network through cordless phone master device 10, and is connectable to mobile phone 40 through cordless phone master device 10 and access point 20. Mobile phone 40 is connected to cordless phone master device 10 and a wireless LAN through access point 20. Mobile phone 40 is connectable to cordless phone slave device 30 and the fixed telephone network, through access point 20 and cordless phone master device 10.

In FIG. 1, cordless phone slave device 30 employs a digital enhanced cordless telecommunications (DECT) system as a wireless communication system between the slave device and the master device, and cordless phone slave device 30 is connectable to the fixed telephone network and the mobile phone, through cordless phone master device 10. Mobile phone 40 is connectable to cordless phone slave device 30 and the fixed telephone network through cordless phone master device 10, and is also connectable to the Internet through access point 20.

Although FIG. 1 illustrates a case where mobile phone 40 is connected to cordless phone master device 10 through access point 20, cordless phone master device 10 has a wireless LAN repeater function, mobile phone 40 is directly connected to cordless phone master device 10, and can be connected to the Internet from cordless phone master device 10 through access point 20.

Figure 2:
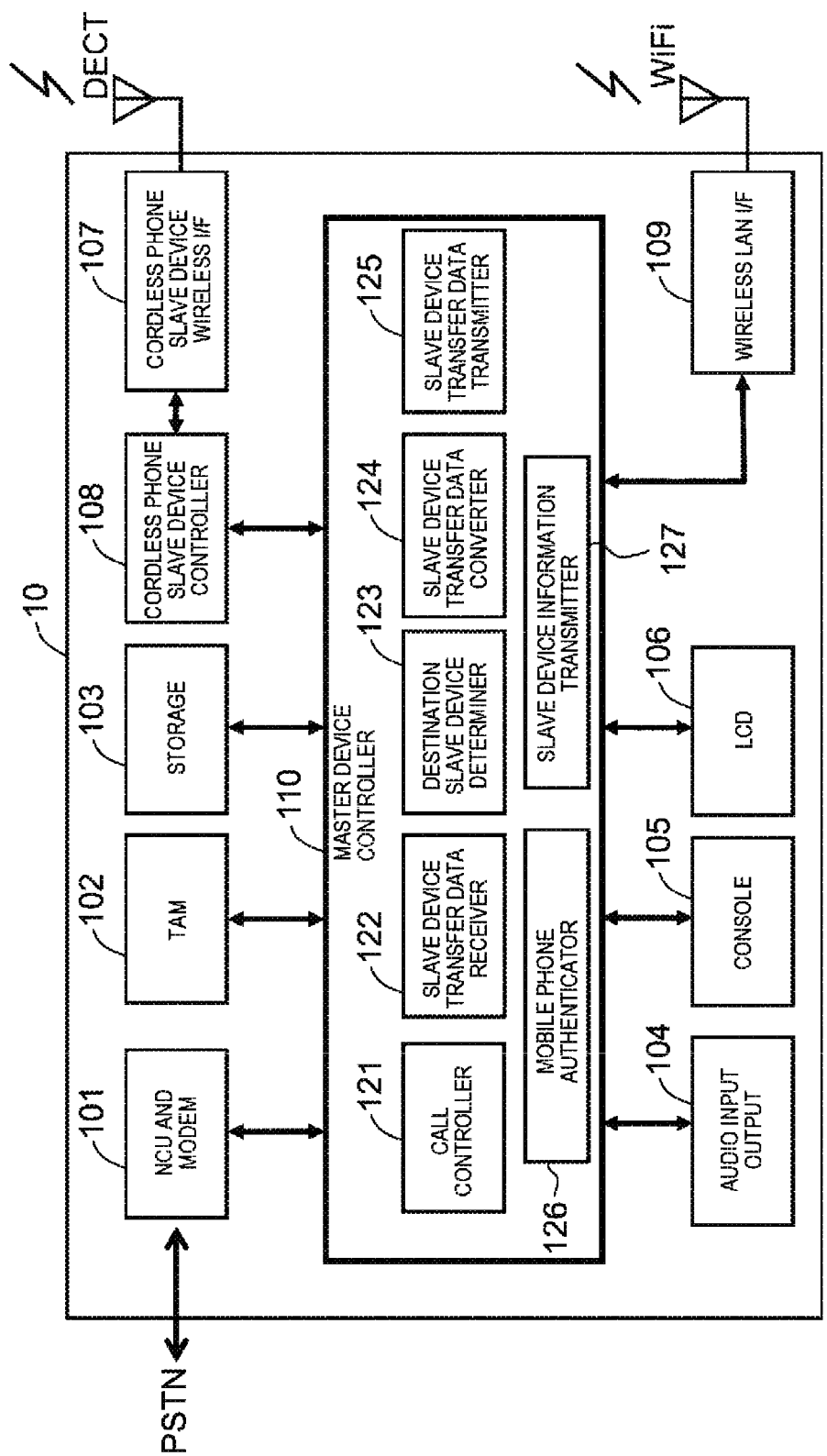
FIG. 2 is a block diagram illustrating a configuration of a cordless phone master device illustrated in FIG. 1.

FIG. 2 is a block diagram illustrating a configuration of cordless phone master device 10 illustrated in FIG. 1. Hereinafter, the configuration of cordless phone master device 10 will be described with reference to FIG. 2.

Network control unit (NCU) and modem 101 includes a network control circuit (NCU) that controls a telephone line, such as the connection with the public line during a call and incoming call detection from the public line, and a modem that receives caller number information from the public line during incoming call.

Telephone answering machine (TAM) 102 stores an answering machine message, and performs the recording and playback of messages.

Storage 103 stores various types of setting data, phone book data, call history information, and slave device additional information including the communication history of the slave device such as an SMS message of the cordless phone apparatus. With respect to the cordless phone apparatus, there is a case of providing phone book data for each cordless phone slave device 30, and a case of providing phone book data which is commonly used in all of cordless phone slave devices 30. Cordless phone master device 10 stores and manages at least one of phone book data provided for each of cordless phone slave devices 30 and phone book data which is commonly used in all of cordless phone slave devices 30.

Figures 3B, 4:
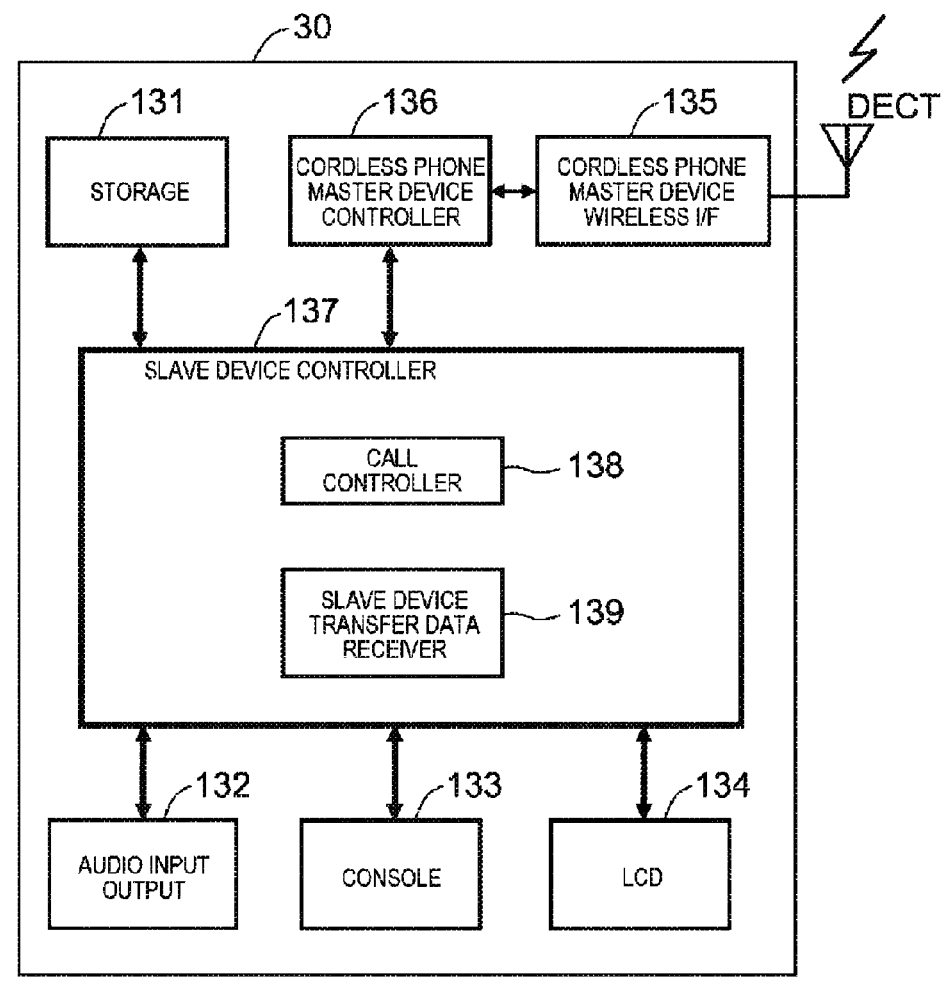
FIG. 3B is a diagram illustrating an example of the slave device information table.
FIG. 4 is a block diagram illustrating a configuration of a cordless phone slave device illustrated in FIG. 1.

Storage 103 stores slave device information as illustrated in FIG. 3A. In the slave device information, each cordless phone slave device 30 (slave device 1 to slave device 6) is associated with the connection state of each cordless phone slave device 30, a slave device name, a slave device number (a slave device extension number or a port number), wallpaper data information of a slave device (the image format, the number of colors, the image size, or the like), thumbnail data information (the image format, the number of colors, the image size, or the like), ringtone memory information (a memory capacity, or a playback time) and use CODEC. The slave device name and the slave device number are used as the slave device identification information for identifying the slave device. The wallpaper data information, the thumbnail data information, the ringtone memory information and the use CODEC information are used as conversion format information when converting to the data used in the slave device. Cordless phone master device 10 may acquire the afore-mentioned conversion format information, depending on the device capability of each slave device, based on the model information received from the slave device at the time of connection with each cordless phone slave device 30, or if only a slave device of a single model is connected to the master device, as illustrated in FIG. 3B, cordless phone master device 10 may uniquely determine and use conversion format information which is used in common by slave devices fixed in a system.

Audio input output 104 includes a microphone, a speaker and a CODEC, and performs the output of a ringtone and the input and output of call voice.

Console 105 includes a dial for the user to perform an operation, and various function buttons, and liquid crystal display (LCD) 106 displays various types of information.

Cordless phone slave device wireless I/F 107 is a circuit for transmitting and receiving wireless data to and from cordless phone slave device 30, and includes an RF/IF converter that performs frequency conversion of a wireless signal, a modem that performs modulation and demodulation, and a digital signal processing circuit that performs a TDMA signal process.

Cordless phone slave device controller 108 transmits and receives control data to and from cordless phone slave device 30, and performs protocol control such as making a call and receiving a call according to the control protocol between cordless phone slave device 30 and cordless phone master device 10 (for example, a DECT protocol system, a PHS protocol system, or the like). In the following description, it is assumed that the DECT system is employed for the control protocol between cordless phone slave device 30 and cordless phone master device 10.

Wireless LAN I/F 109 performs wireless LAN protocol control of IEEE 802.11 (Wi-Fi (registered trademark)), and transmits and receives wireless data to and from mobile phone 40. Incidentally, wireless LAN I/F 109 may use a short-range wireless communication technique such as Bluetooth (registered trademark) or ZigBee (registered trademark).

Master device control unit 110 controls entire cordless phone master device 10. Specifically, master device controller 110 receives and analyzes the event and message, which are generated in respective units in the periphery of master device controller 110, controls the state of incoming and outgoing calls and call connection, and gives an instruction to each unit. Master device controller 110 includes call controller 121, slave device transfer data receiver 122, destination slave device determiner 123, slave device transfer data converter 124, slave device transfer data transmitter 125, mobile phone authenticator 126, and slave device information transmitter 127.

Call controller 121 processes events and various messages which are received from NCU and modem 101 and cordless phone slave device controller 108.

Slave device transfer data receiver 122 receives slave device transfer data from mobile phone 40 through wireless LAN I/F 109, and stores the slave device transfer data in storage 103.

Destination slave device determiner 123 extracts destination slave device information from the slave device transfer data stored in storage 103, and determines cordless phone slave device 30 which is a destination of the slave device transfer data, based on the slave device identification information (the slave device name, the slave device extension number or the slave device port number) which is set in the destination slave device information.

Slave device transfer data converter 124 executes a predetermined conversion process, based on the type of the slave device transfer data stored in storage 103 and the conversion format information of the destination slave device. Specifically, in a case where the slave device transfer data is ringtone data, slave device transfer data converter 124 converts the audio format of the ringtone data according to the use CODEC of cordless phone slave device 30 of the slave device information, and converts the size of the ringtone data so as to be within the size (or the maximum playback time) of the ringtone of cordless phone slave device 30 of slave device information. In a case where the slave device transfer data is wallpaper data, slave device transfer data converter 124 converts the image size of the wallpaper data according to the wallpaper size of cordless phone slave device 30 of the slave device information. In a case where the slave device transfer data is phone book data, slave device transfer data converter 124 converts the image size of the thumbnail data included in the phone book data according to the thumbnail size of cordless phone slave device 30 of the slave device information. The wallpaper data information, the thumbnail data information, the ringtone memory information and the use CODEC information of the slave device information are collectively referred to as conversion format information.

Although only the size conversion of the wallpaper data and the thumbnail data is described in the present exemplary embodiment, the conversion of the image data includes not only the size conversion but also image format conversion. In the following description, the size conversion of an image is used as an example of the conversion of image data, but in the present disclosure, image data conversion other than the size conversion, for example, conversion from a JPEG format to a BMP format may be performed.

Slave device transfer data transmitter 125 transmits slave device transfer data on which the conversion process is executed by slave device transfer data converter 124, to cordless phone slave device 30 which is selected by destination slave device determiner 123, through cordless phone slave device wireless I/F 107. The slave device transfer data transmitter 125 notifies mobile phone 40 of a message indicating a fact that the conversion process is not performed, or a message indicating a fact that the conversion process is performed.

Mobile phone authenticator 126 performs the connection authentication of mobile phone 40. Specifically, mobile phone authenticator 126 receives an authentication request (an authentication ID, and an authentication password) from mobile phone 40 determines whether or not the combination of the authentication ID and the authentication password which are included in the authentication request matches any one of the combination of the authentication ID and the authentication password of storage 103. In a case of match, mobile phone authenticator 126 authorizes the authentication and transmits an authentication response (OK) to mobile phone 40; and in a case of mismatch, mobile phone authenticator 126 does not authorizes the authentication and transmits an authentication response (NG) to mobile phone 40.

Slave device information transmitter 127 transmits the slave device information stored in storage 103 (the slave device identification information of FIG. 3A or FIG. 3A and the conversion format information of FIG. 3B), to mobile phone 40 through wireless LAN I/F 109.

The conversion format information of the slave device information transmitted to mobile phone 40 may be information on each slave device illustrated in FIG. 3A, and in a case where only slave devices of the same model are connected, the conversion format information may be information which is common to the slave devices which are illustrated in FIG. 3B.

FIG. 4 is a block diagram illustrating a configuration of cordless phone slave device 30 illustrated in FIG. 1. Below, a description will be given on the configuration of cordless phone slave device 30 with reference to FIG. 4.

Storage 131 stores various data used in cordless phone slave device 30, such as the ringtone data, the wallpaper data, and the phone book data, in a predetermined storage area.

Audio input output 132 includes a microphone, a speaker and a CODEC, and performs the output of a ringtone and the input and output of call voice.

Console 133 includes a dial for the user to perform an operation, and various function buttons, and liquid crystal display (LCD) 134 displays various types of information.

Cordless phone master device wireless I/F 135 is a circuit for transmitting and receiving wireless data to and from cordless phone master device 10, and includes an RF/IF converter that performs frequency conversion of a wireless signal, a modem that performs modulation and demodulation, and a digital signal processing circuit that performs a TDMA signal process.

Cordless phone master device controller 136 transmits and receives control data to and from cordless phone master device 10, and performs protocol control such as making a call and receiving a call according to the control protocol between cordless phone slave device 30 and cordless phone master device 10 (for example, a DECT protocol system, a PHS protocol system, or the like).

Slave device controller 137 controls entire cordless phone slave device 30. Specifically, slave device controller 137 receives and analyzes the event and message, which are generated in respective units in the periphery of slave device controller 137, controls the state of incoming and outgoing calls and call connection, and gives an instruction to each unit. Slave device controller 137 includes call controller 138 and slave device transfer data receiver 139.

Call controller 138 processes events and various messages which are received from cordless phone master device controller 136.

Slave device transfer data receiver 139 receives slave device transfer data from cordless phone master device 10 through cordless phone master device wireless I/F 135, and stores the slave device transfer data in the storage area of storage 131 according to the type of the slave device transfer data.

Figure 5:
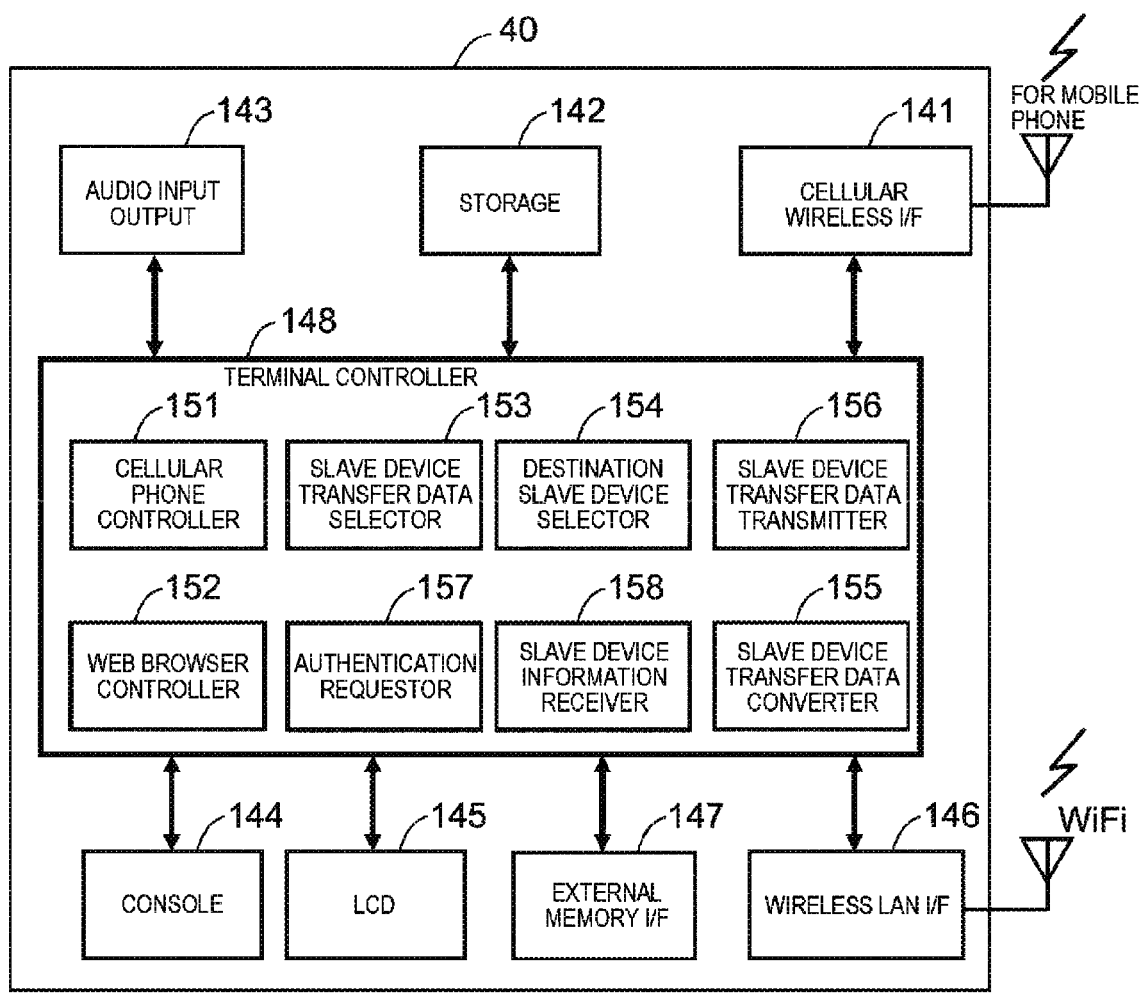
FIG. 5 is a block diagram illustrating a configuration of a mobile phone (wireless IP terminal) illustrated in FIG. 1.

FIG. 5 is a block diagram illustrating a configuration of mobile phone 40 illustrated in FIG. 1. Below, a description will be given on the configuration of mobile phone 40 with reference to FIG. 5.

Cellular wireless I/F 141 performs wireless data transmission and reception with the mobile phone base station through a mobile phone antenna.

Storage 142 stores information such as various setting data of mobile phone 40, phone book data, call history information, an SMS message, various image data (including wallpaper data), music data (including ringtone data).

Audio input output 143 includes a microphone and a speaker, and performs the output of a ringtone and the input and output of call voice.

Console 144 includes a dial for the user to perform an operation, and various function buttons, and LCD 145 displays various types of information. The touch panel of a smart phone may form console 144 and LCD 145.

Wireless LAN I/F 146 performs wireless LAN protocol control of IEEE802.11, and transmits and receives wireless data to and from cordless phone master device 10. Wireless LAN I/F 146 may use a short-range wireless communication technique such as Bluetooth (registered trademark) or ZigBee (registered trademark), according to cordless phone master device 10.

External memory I/F 147 has a shape in which an external memory such as an SD card is removable and attachable, and reads/writes data to and from the mounted external memory.

Terminal controller 148 controls entire mobile phone 40. Specifically, terminal controller 148 receives and analyzes the event and message, which are generated in respective units in the periphery of terminal controller 148, controls the state of incoming and outgoing calls and call connection, and gives an instruction to each unit. Terminal controller 148 includes cellular phone controller 151, Web browser controller 152, slave device transfer data selector 153, destination slave device selector 154, and slave device transfer data transmitter 156.

Cellular phone controller 151 processes a call control message received from cellular wireless I/F 141.

Web browser controller 152 performs control so as to download HTML files, image files, music files, and the like from the Internet through cellular wireless I/F 141 or wireless LAN I/F 146, and displays and plays the down loaded files back while analyzing a Web screen layout.

Slave device transfer data selector 153 selects data (slave device transfer data) to be transferred to cordless phone slave device 30, from a data group stored in storage 142, based on a user's operation from console 144 (including LCD 145), and outputs the selected data to slave device transfer data converter 156.

Destination slave device selector 154 selects cordless phone slave device 30 which is a destination of data, based on a user's operation from console 144 (including LCD 145), and outputs the selected data to slave device transfer data converter 156. Destination slave device selector 154 is able to select one or a plurality of cordless phone slave devices 30.

Slave device transfer data converter 155 executes a predetermined conversion process, on slave device transfer data which is output from slave device transfer data selector 153, based on the type of the slave device transfer data and the conversion format information. Specifically, in a case where the slave device transfer data is ringtone data, slave device transfer data converter 155 converts the audio format of the ringtone data according to the use CODEC of cordless phone slave device 30, and converts the size of the ringtone data so as to be within the size (or the maximum playback time) of the ringtone of cordless phone slave device 30 of slave device information. In a case where the slave device transfer data is wallpaper data, slave device transfer data converter 155 converts the image size of the wallpaper data into the wallpaper size of cordless phone slave device 30. In a case where the slave device transfer data is phone book data, slave device transfer data converter 155 converts the image size of the thumbnail data of the slave device transfer data into the thumbnail size of cordless phone slave device 30.

Slave device transfer data transmitter 156 edits the slave device transfer data on which slave device transfer data converter 155 executes a conversion process. Specifically, slave device transfer data transmitter 156 generates the header portion of the slave device transfer data, and sets the destination slave device identification information (the slave device name, the slave device extension number or the slave device port number) indicating cordless phone slave device 30 which is selected by destination slave device selector 154, in the destination slave device information of the slave device transfer data message of the header portion. Slave device transfer data transmitter 156 transmits the edited slave device transfer data to cordless phone master device 10, through wireless LAN I/F 146.

Authentication requestor 157 transmits an authentication request for connection, to cordless phone master device 10 through wireless LAN I/F 146.

Slave device information receiver 158 receives slave device information (the slave device identification information of FIG. 3A or FIG. 3A, or the conversion format information of FIG. 3B) from cordless phone master device 10 though wireless LAN I/F 146, and stores the slave device information in storage 142.

Next, a processing procedure up to the storage of the slave device information that is stored in cordless phone master device 10, in mobile phone 40 will be described with reference to FIG. 6, FIG. 7, FIG. 8 and FIG. 9.

Figure 6:
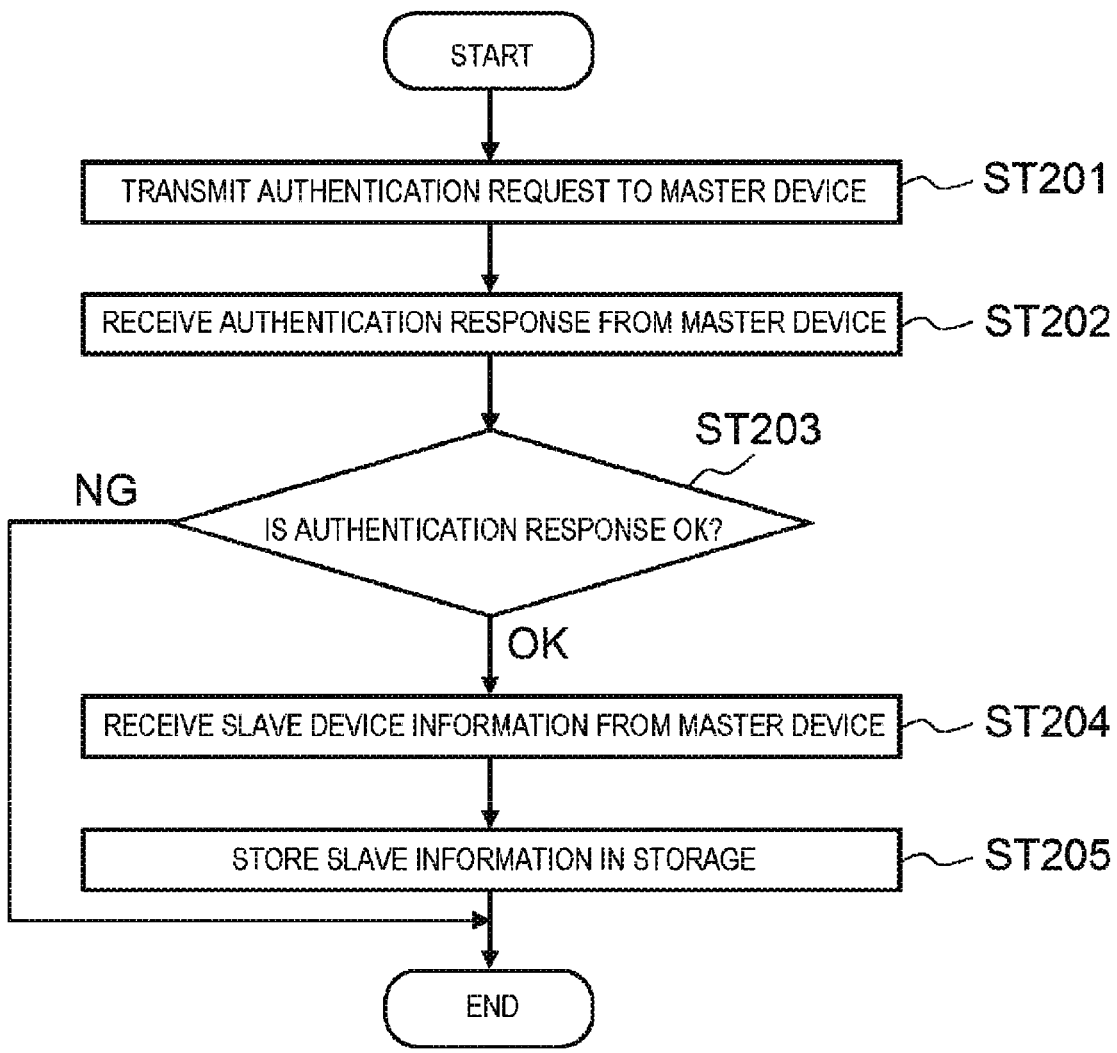
FIG. 6 is a flow chart illustrating a processing procedure at the time of connection authentication of a mobile phone illustrated in FIG. 5.

FIG. 6 is a flow chart illustrating a processing procedure at the time of connection authentication of mobile phone 40. First, in ST201, authentication requestor 157 transmits an authentication request to cordless phone master device 10, based on the user's operation of console 144 (including LCD 145).

Next, in ST202, authentication requestor 157 receives an authentication response from cordless phone master device 10.

Then, in a case where the authentication response is OK (ST203: OK), in ST204 and ST205, slave device information receiver 158 receives slave device information from cordless phone master device 10, and stores the slave device information in storage 142. In contrast, in a case where the authentication response is NG (ST203: NG), the flow ends.

Figure 7:
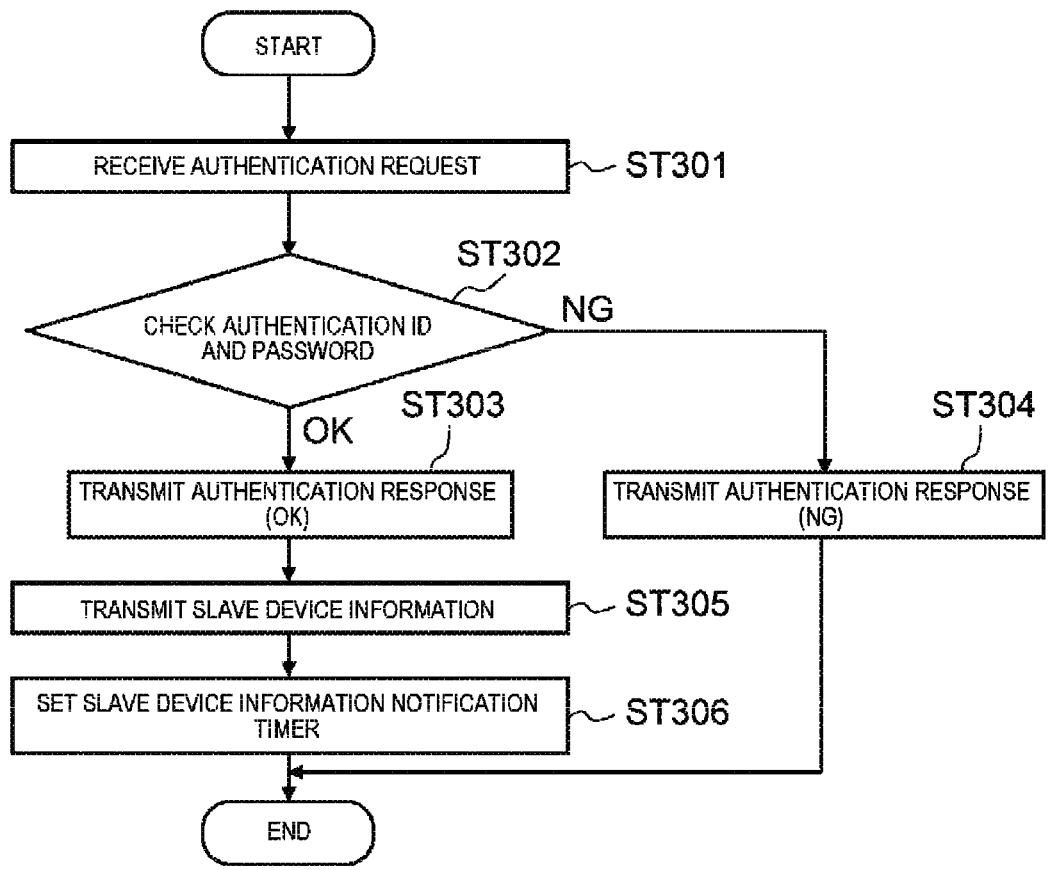
FIG. 7 is a flow chart illustrating a processing procedure at the time of the connection authentication of the cordless phone master device illustrated in FIG. 2.

FIG. 7 is a flow chart illustrating a processing procedure at the time of connection authentication of cordless phone master device 10. First, in ST301, mobile phone authenticator 126 receives an authentication request from mobile phone 40.

Next, in ST302, mobile phone authenticator 126 checks the authentication ID and the authentication password which are included in the authentication request.

If the authentication is confirmed (ST302: OK), mobile phone authenticator 126 transmits an authentication response (OK) to mobile phone 40 in ST303. In contrast, if authentication is not confirmed (ST302: NG), mobile phone authenticator 126 transmits an authentication response (NG) to mobile phone 40 in ST304.

After ST303, slave device information transmitter 127 transmits slave device information to mobile phone 40, and sets a slave device information notification timer, respectively in ST305 and ST306.

Figure 8:
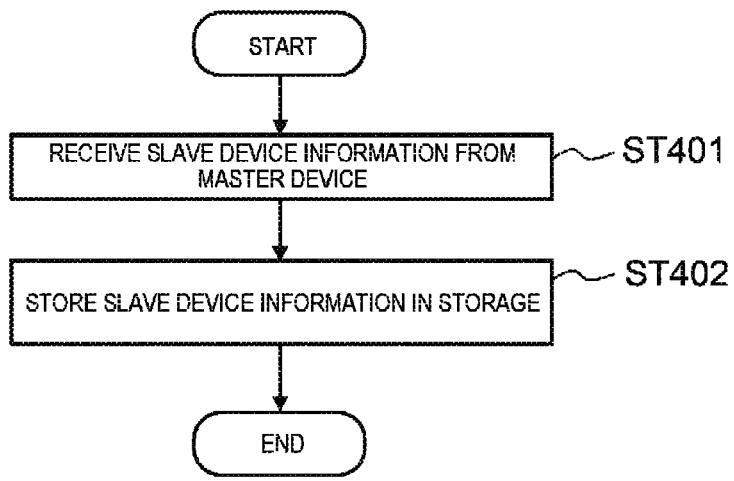
FIG. 8 is a flow chart illustrating a processing procedure after connection authentication of the mobile phone illustrated in FIG. 5.

FIG. 8 is a flow chart illustrating a processing procedure after connection authentication of mobile phone 40. After connection authentication, slave device information receiver 158 receives slave device information from cordless phone master device 10, and stores the slave device information in storage 142, respectively in ST401 and ST402.

Figure 9:
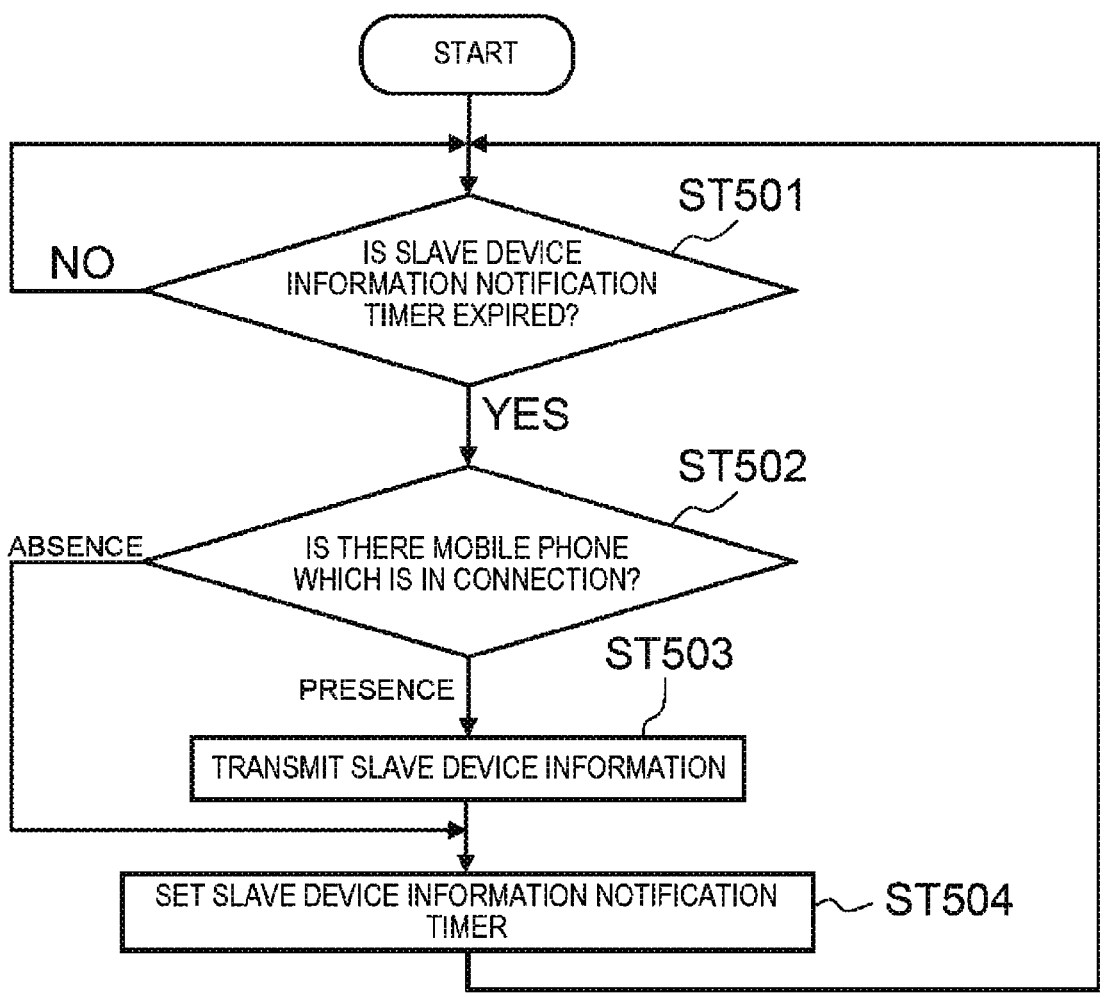
FIG. 9 is a flow chart illustrating a processing procedure after the connection authentication of the cordless phone master device illustrated in FIG. 2.

FIG. 9 is a flow chart illustrating a processing procedure after connection authentication of cordless phone master device 10. After the connection authentication, in ST501 and ST502, each time a slave device information notification timer expires, slave device information transmitter 127 determines whether or not there is mobile phone 40 which is in connection with cordless phone master device 10.

If there is mobile phone 40 which is in connection (ST502: YES), slave device information transmitter 127 transmits slave device information to mobile phone 40, and sets the slave device information notification timer, respectively in ST503 and ST504. In contrast, if there is no mobile phone 40 which is in connection (ST502: NO), slave device information transmitter 127 sets the slave device information notification timer in ST504.

Next, a processing procedure up to the storage of various data (phone book data, wallpaper data, and ringtone data) which are stored in mobile phone 40 in cordless phone slave device 30, in a state available in cordless phone slave device 30 will be described with reference to FIG. 10 to FIG. 12.

Figure 10:
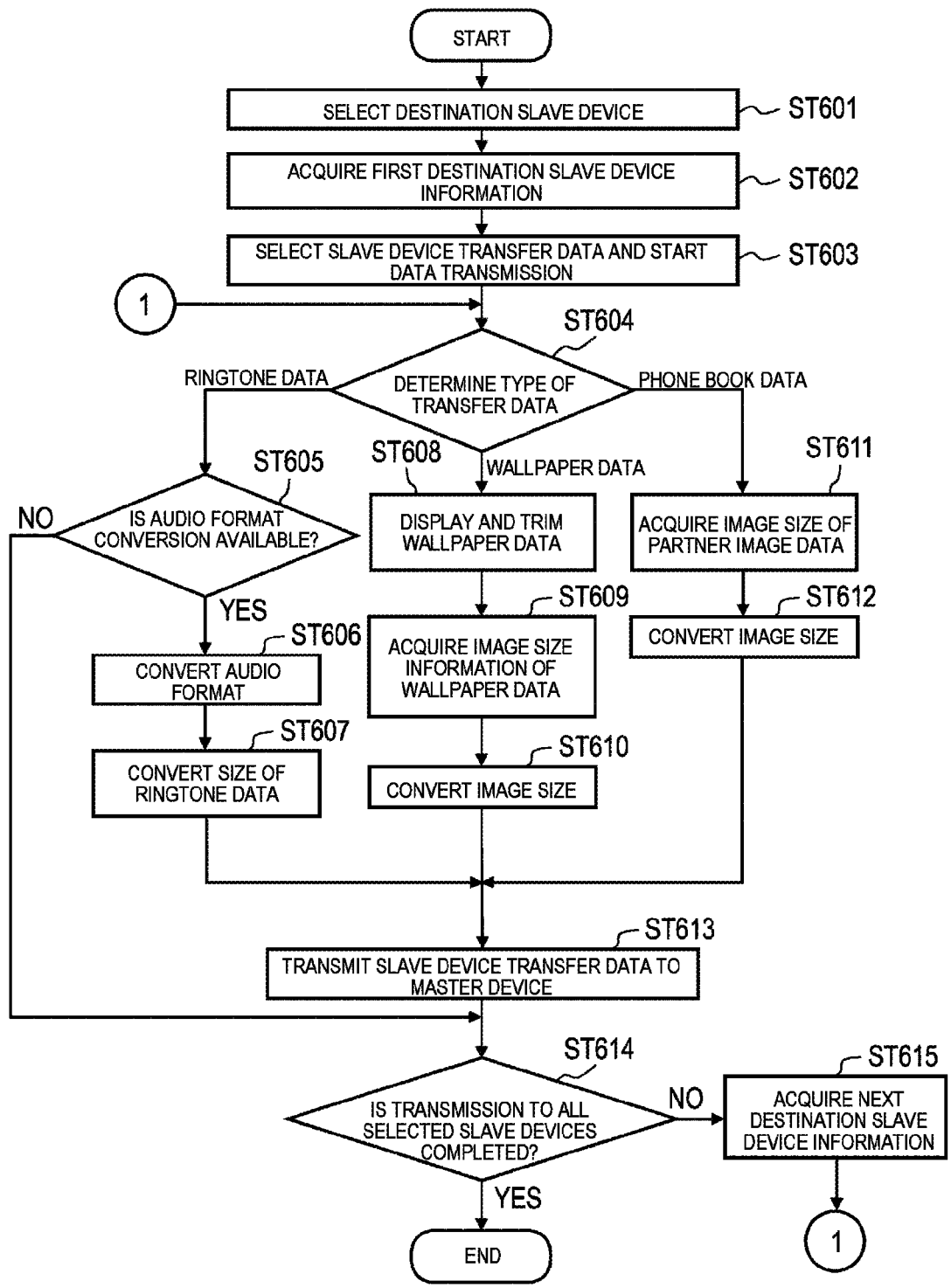
FIG. 10 is a flow chart illustrating a processing procedure of the mobile phone illustrated in FIG. 5.

FIG. 10 is a flow chart illustrating a processing procedure at the time of data transfer of mobile phone 40. First, in ST601, destination slave device selector 154 selects one or a plurality of cordless phone slave devices 30 which are data destinations (a destination slave devices), based on the user's operation of console 144 (including LCD 145). In ST602, destination slave device selector 154 acquires slave device information on a first destination slave device. Destination slave device selector 154 displays the selected slave device identification information (a slave device name or a slave device number) on LCD 145, based on the slave device information which is previously received from cordless phone master device 10, and is able to select one or a plurality of cordless phone slave devices 30 among the plurality of slave devices, based on the user's instruction.

Next, in ST603, slave device transfer data selector 153 selects data (slave device transfer data) to be transferred to cordless phone slave device 30 from among various data groups (phone book data, wallpaper data, ringtone data, and the like) which are stored in storage 142, based on the user's operation of console 144 (including LCD 145), and starts data transmission to the slave device which is selected in ST601.

Next, in ST604, slave device transfer data converter 155 determines the type of slave device transfer data which is stored in storage 142.

Then, in a case where the slave device transfer data is ringtone data (ST604: "ringtone data"), slave device transfer data converter 155 determines whether or not the slave device transfer data is ringtone data for which format conversion is available in cordless phone slave device 30 in ST605.

In a case where format conversion is available (ST605: YES), in ST606, slave device transfer data converter 155 converts the audio format of the slave device transfer data (ringtone data) according to use CODEC present in the slave device information on cordless phone slave device 30. In ST607, slave device transfer data converter 155 converts the size of the ringtone data according to the size of the ringtone of cordless phone slave device 30 of the slave device information. Thereafter, the flow proceeds to ST613. In contrast, in a case where the format conversion is not available (ST605: NO), slave device transfer data converter 155 ends the process.

In a case where the slave device transfer data is wallpaper data (ST604: "wallpaper data"), in ST608, slave device transfer data converter 155 displays the wallpaper data, and performs a processing process such as trimming as necessary. Next, in ST609, slave device transfer data converter 155 acquires image size information from the header of the slave device transfer data. In ST610, slave device transfer data converter 155 acquires the size of the slave device transfer data (wallpaper data) from the slave device information, and converts the size of the slave device transfer data so as to be played back in cordless phone slave device 30. Thereafter, the flow proceeds to ST613.

In a case where the slave device transfer data is phone book data (ST604: "phone book data"), slave device transfer data converter 155 acquires image size information of the thumbnail data (partner image data) from the header of the slave device transfer data in ST611. In ST612, slave device transfer data converter 155 acquires the image size of the thumbnail data of the slave device transfer data from the slave device information, and converts the image size of the thumbnail data so as to be played back in cordless phone slave device 30. Thereafter, the flow proceeds to ST613.

In ST613, slave device transfer data transmitter 156 edits the slave device transfer data which is output from destination slave device selector 154, and transmits the edited slave device transfer data to cordless phone master device 10 through wireless LAN IT 146. In the editing, slave device transfer data transmitter 156 sets a transfer data type (phone book data, wallpaper data, or ringtone data), and destination slave device identification information indicating cordless phone slave device 30 selected by slave device transfer data selector 153 in the header portion of the slave device transfer data, and edits a transfer data body portion (a ringtone data portion, an image data portion, and a phone book data portion).

Through the process of ST613, in a case where data transmission to all cordless phone slave devices 30 selected by destination slave device selector 154 is completed (ST614: YES), the flow ends. In contrast, after the process of ST613, in a case where the data transmission to any cordless phone slave devices 30 selected by destination slave device selector 154 is not completed (ST614: NO), destination slave device selector 154 acquires the slave device information of the next data destination slave device in ST615. Thereafter, the flow proceeds to ST604.

Although an example of a flow of selecting slave device transfer data for each destination slave device and transmitting the slave device transfer data is illustrated in the flow chart of FIG. 10, cordless phone master device 10 may be instructed to transfer the slave device transfer data to a plurality of slave device, through one time of transmission of slave device transfer data, by selecting the plurality of destination slave devices and transmitting slave device transfer data obtained by editing the destination slave device information so as to include the plurality of pieces of slave device identification information. After transfer data is selected first, a destination slave device may be selected (a plurality of devices can be selected), and slave device transfer data may be transferred.

Figure 11:
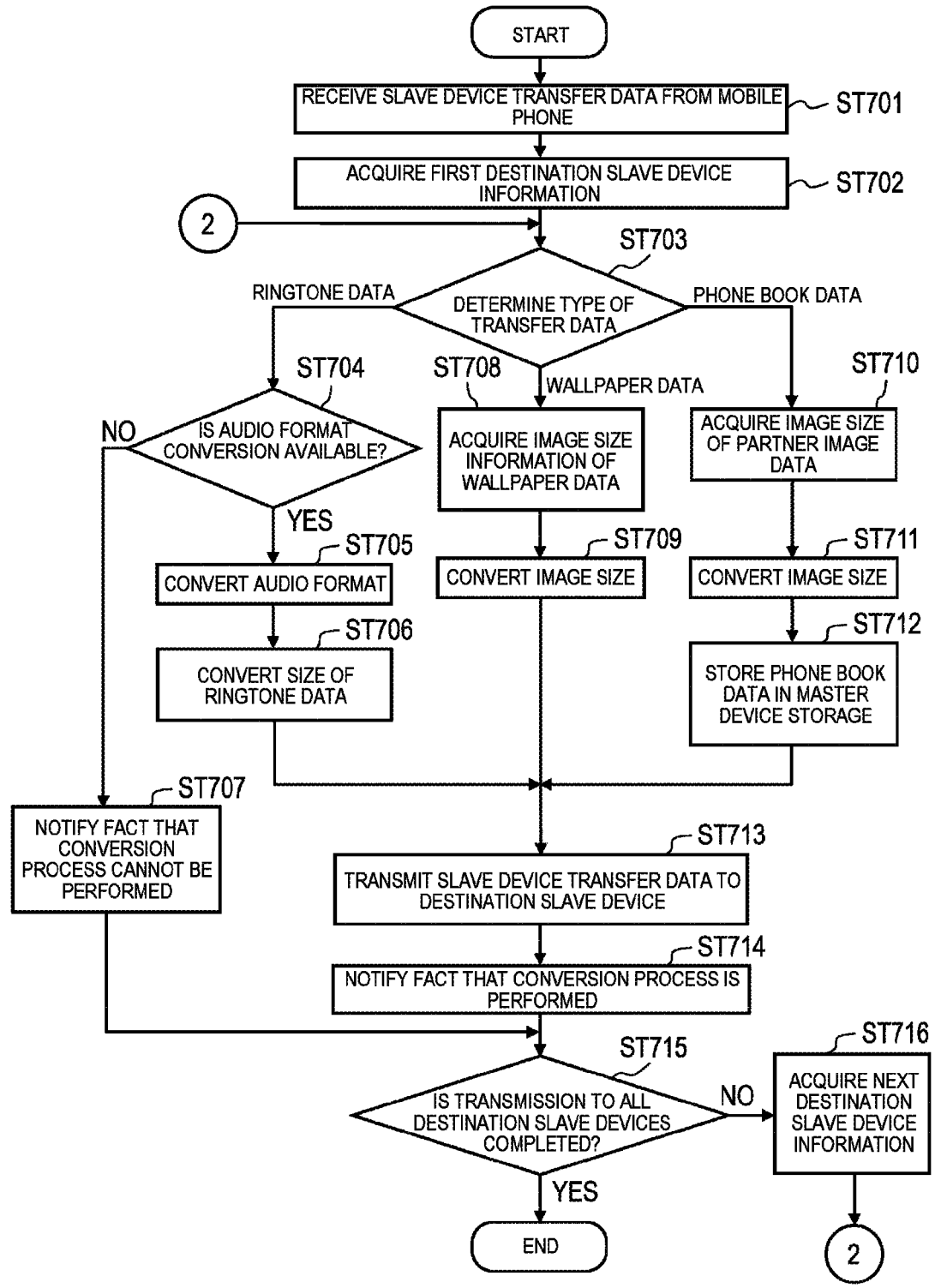
FIG. 11 is a flow chart illustrating a processing procedure of the cordless phone master device illustrated in FIG. 2.

FIG. 11 is a flow chart illustrating a processing procedure at the time of data transfer of cordless phone master device 10. First, in ST701, slave device transfer data receiver 122 receives slave device transfer data from mobile phone 40 through wireless LAN I/F 109, and stores the received data in storage 103.

Next, in ST702, destination slave device determiner 123 extracts the first destination slave device information from the slave device transfer data stored in storage 103, and selects cordless phone slave device 30 which is a destination of the slave device transfer data, based on the destination slave device identification information which is set in the destination slave device information.

Next, in from ST703 to ST711, slave device transfer data converter 124 performs a predetermined conversion process according to the type of slave device transfer data.

Specifically, first, in ST703, slave device transfer data converter 124 determines the type of the slave device transfer data stored in the storage 103.

In a case where the slave device transfer data is the ringtone data (ST703; "ringtone data"), slave device transfer data converter 124 determines whether or not the slave device transfer data is ringtone data for which format conversion is possible in cordless phone slave device 30 ST704. For example, in a case where the audio format of the ringtone data of the slave device transfer data is the MPEG Audio Layer-3 (MP3) or the WAV format, slave device transfer data converter 124 determines that format conversion is possible; and in a case of other audio formats, slave device transfer data converter 124 determines that format conversion is not possible.

In a case where format conversion is possible (ST704; YES), slave device transfer data converter 124 converts the audio format of the slave device transfer data (ringtone data) according to the use CODEC of cordless phone slave device 30, in ST705. For example, format conversion is performed from MP3 to a format in which playback is possible in the G.722. In ST706, slave device transfer data converter 124 converts the size of the ringtone data to be in the size of the ringtone of cordless phone slave device 30 of the slave device information. Thereafter, the flow proceeds to ST713.

In contrast, in a case where the format conversion is not possible (ST704: NO), slave device transfer data transmitter 125 notifies mobile phone 40 of a message indicating a fact that the conversion process cannot be performed in ST707. Thereafter, the flow proceeds to ST715.

In a case where the slave device transfer data is wallpaper data (ST703: "wallpaper data"), slave device transfer data converter 124 acquires image size information from the image data header portion (for example, a BMP header portion, or the like) of the slave device transfer data in ST708. In ST709, slave device transfer data converter 124 converts the image size of the slave device transfer data (wallpaper data) so as to be played back in cordless phone slave device 30. For example, if the size information on the image data transmitted from mobile phone 40 is XGA (1024×768 pixel) size and the size of image data that can be displayed on cordless phone slave device 30 is QVGA (320×240 pixel) size, an image conversion process from XGA into QVGA size is performed. Thereafter, the flow proceeds to ST713.

In a case where the slave device transfer data is the phone book data (ST703: "phone book data"), slave device transfer data converter 124 acquires image size information of the thumbnail data from the header of the slave device transfer data in ST710. In ST711, slave device transfer data converter 124 converts the image size of the thumbnail data of the slave device transfer data so as to be played back in cordless phone slave device 30, similar to the afore-mentioned wallpaper data.

Next, in ST712, slave device transfer data transmitter 125 stores the slave device transfer data (phone book data) on which the conversion process is performed by slave device transfer data converter 124, in storage 103. Thereafter, the flow proceeds to ST713.

After the process of ST706, ST709, or ST712, slave device transfer data transmitting unit 125 transmits the slave device transfer data on which the conversion process is performed by slave device transfer data converter 124, to cordless phone slave device 30 which is selected by destination slave device determiner 123, through cordless phone slave device wireless IT 107, in ST713. In ST714, slave device transfer data transmitting unit 125 notifies mobile phone 40 of the message indicating the fact that the conversion process is performed.

Through the process of ST707 or ST714, in a case where the data transmission to all cordless phone slave devices 30 which are determined by destination slave device determiner 123 is completed (ST715: YES), the flow ends. In contrast, after the process of ST707 or ST714, in a case where the data transmission to any cordless phone slave device 30 which is determined by destination slave device determiner 123 is not completed (ST715: NO), destination slave device determiner 123 extracts the next destination slave device information from the slave device transfer data stored in storage 103, and selects cordless phone slave device 30 which is a destination of the slave device transfer data, based on the destination slave device identification information which is set in the destination slave device information in ST716. Thereafter, the flow proceeds to ST703.

Figure 12:
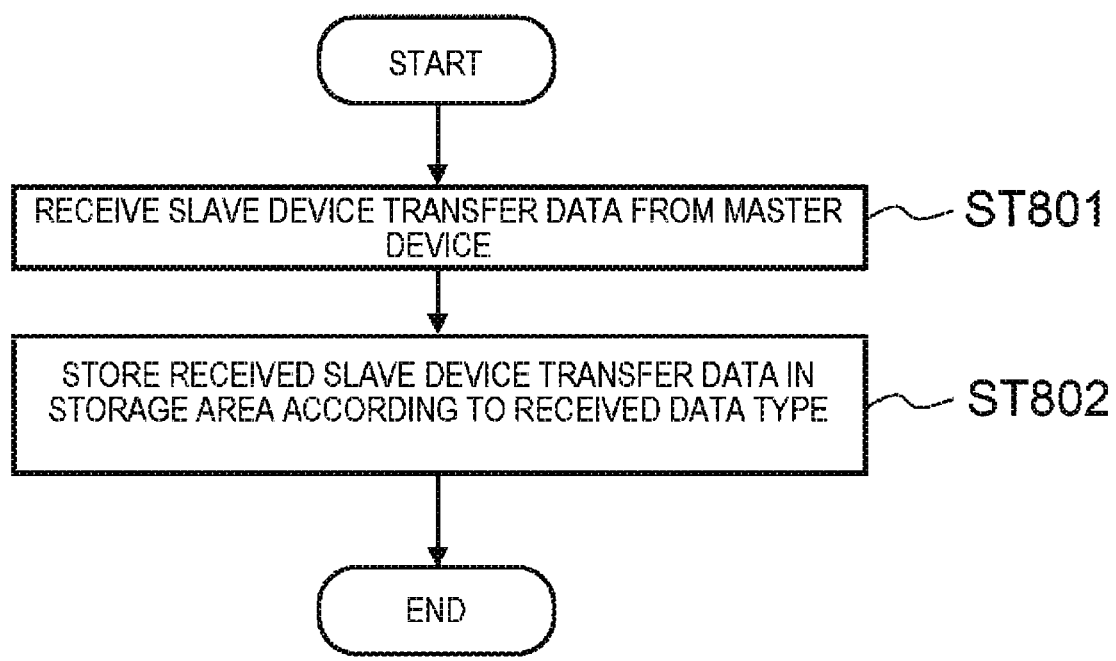
FIG. 12 is a flow chart illustrating a processing procedure of the cordless phone slave device illustrated in FIG. 4.

FIG. 12 is a flow chart illustrating a processing procedure at the time of data transfer of cordless phone slave device 30. First, in ST801, slave device transfer data receiver 139 receives the slave device transfer data from cordless phone master device 10, through cordless phone master device wireless I/F 135.

Next, in ST802, slave device transfer data receiver 139 stores the slave device transfer data in the storage area of storage 131, according to the type of slave device transfer data.

Although the case where the conversion process for the slave device transfer data is performed in both cordless phone master device 10 and mobile phone 40 is described in the above description, without the present disclosure being limited thereto, the conversion process for the slave device transfer data may be performed only by one of cordless phone master device 10 and mobile phone 40. Although the selection of the ringtone data and the conversion process are described in the above description, it is possible to perform the same process as in the ringtone data on the sound source data such as holding tone data and a guidance messages of an answering machine, which are used in cordless phone slave device 30, in the present disclosure.

Although the conversion process of the image size is described as an example of the conversion process of the wallpaper image data and the thumbnail data in the above description, the conversion of the image format as well as the size may be performed as the conversion of the image data in the present disclosure.

In the present disclosure, it is also possible to distribute the conversion process function such that cordless phone master device 10 performs the conversion process on some types of slave device transfer data and mobile phone 40 performs the conversion process on other types of slave device transfer data. For example, cordless phone master device 10 performs the conversion process of the ringtone data of which the data capacity is small and the processing load is light, and mobile phone 40 performs the conversion process of the image data of which the data capacity is large and the processing load is heavy.

In a case where the ringtone data is included in the slave device transfer data, cordless phone slave device 30 can play the ringtone data back as it is by using the use CODEC. In a case where the wallpaper data is included in the slave device transfer data, cordless phone slave device 30 can display the wallpaper data as it is on the liquid crystal display unit. In a case where the phone book data is included in the slave device transfer data, cordless phone slave device 30 can display the thumbnail data corresponding to the telephone number information included in the phone book data, as it is, on the liquid crystal display unit. Cordless phone master device 10 can store the phone book data in the storage, and use it as the phone book data that its own device (master device) manages.

In this manner, in the present exemplary embodiment, since slave device information that cordless phone master device 10 has is transferred to mobile phone 40, the user of mobile phone 40 can display and select the destination slave device of the slave device transfer data based on the slave device information, and can store the specific data that is stored in mobile phone 40 in designated cordless phone slave device 30 in the state available in the cordless phone slave device 30.

Although the slave device name and the slave device number (the slave device extension number or the port number) is described as an example of the slave device identification information for identifying the slave device in the above-described exemplary embodiment, without the present disclosure being limited thereto, as long as can identify the slave device, other information may be used as the slave device identification information.

Although the case of converting the image size of the wallpaper data when the slave device transfer data includes the wallpaper data is described as an example in the above-described exemplary embodiment, without the present disclosure being limited thereto, it becomes possible to perform conversion into a predetermined format or into image data of a predetermined number of colors.

Although the case of converting the image size of the thumbnail data when the slave device transfer data includes the phone book data is described as an example in the above-described exemplary embodiment, without the present disclosure being limited thereto, it becomes possible to perform conversion into a predetermined format or into image data of a predetermined number of colors.

INDUSTRIAL APPLICABILITY

The cordless phone apparatus, the cordless phone system and the method for transferring data according to the present disclosure are available in storing various data which are stored in a mobile phone in a cordless phone slave device, in a state of being available in the cordless phone slave device, without providing a new device in the cordless phone slave device.

REFERENCE NUMERALS IN THE DRAWINGS

10 cordless phone master device
20 access point
30 cordless phone slave device
40 mobile phone
101 NCU and modem
102 TAM
103, 131, 142 storage
104, 132, 143 audio input output
105, 133, 144 console
106, 134, 145 LCD
107 cordless phone slave device wireless I/F
108 cordless phone slave device controller
109, 146 wireless LAN I/F
110 master device controller
121, 138 call controller
122, 139 slave device transfer data receiver
123 destination slave device determiner
124, 155 slave device transfer data converter
125 slave device transfer data transmitter
126 mobile phone authenticator
127 slave device information transmitter
135 cordless phone master device wireless I/F
136 cordless phone master device controller
137 slave device controller
147 external memory I/F
148 terminal controller
151 cellular phone controller
152 Web browser controller
153 slave device transfer data selector
154 destination slave device selector
156 slave device transfer data transmitter
157 authentication requestor
158 slave device information receiver

The invention claimed is:

1. A cordless phone apparatus, which comprises:
one or more slave devices; and
a master device, which includes:
   a LAN transmitter, which, in operation, transmits slave device information to a wireless IP terminal via a wireless LAN the slave device information including identification information of each slave device registered to the master device,
   a receiver, which, in operation, receives from the wireless IP terminal selection of the identification information of a destination slave device among the one or more slave devices and selection of transfer data including at least one of ringtone data wallpaper data, and phone book data,
   a transfer data converter which, in operation, converts at least one of the ringtone data, wallpaper data, and phone book data included in the transfer data into a data format usable in the destination slave device, and
   a cordless phone transmitter, which, in operation, transmits the converted transfer data to the destination slave device.

2. The cordless phone apparatus according to claim 1, wherein the identification information of a slave device includes at least one of a port number, an extension number, and name information of the slave device.

3. The cordless phone apparatus according to claim 1, wherein the slave device information includes i) information about the transfer data to be transferred to the slave device, and ii) conversion format information including at least information about CODEC used by the slave device.

4. The cordless phone apparatus according to claim 3, wherein the transfer data converter, in operation, converts the transfer data into the data format usable in the destination slave device according to a data type of the transfer data and the conversion format information of the destination slave device.

5. The cordless phone apparatus according to claim 4, wherein the transfer data converter, in operation, converts an audio format of the ringtone data included in the transfer data to be playable based on the CODEC used by the destination slave device.

6. The cordless phone apparatus according to claim 4, wherein the transfer data converter, in operation, converts the ringtone data included in the transfer data such that a data size of the ringtone data after the conversion is within a size of a ringtone memory of the destination slave device.

7. The cordless phone apparatus according to claim 4, wherein the transfer data converter, in operation, converts a size of the wallpaper data included in the transfer data into a wallpaper size of the destination slave device.

8. The cordless phone apparatus according to claim 4, wherein the transfer data converter, in operation, converts a thumbnail image data portion of the phone book data into a thumbnail size of the destination slave device.

9. The cordless phone apparatus according to claim 1, wherein the selection of transfer data received from the wireless IP terminal is either one of: i) indication of the transfer data, or ii) the transfer data.

10. A cordless phone system, comprising:
a cordless phone apparatus which includes one or more slave devices and a master device, wherein the master device includes:
   a LAN transmitter, which, in operation, transmits slave device information to a wireless IP terminal via a wireless LAN, the slave device information including identification information of each slave device registered to the master device,
   a receiver, which, in operation, receives from the wireless IP terminal selection of the identification information of a destination slave device among the one or more slave devices and selection of transfer data including at least one of ringtone data, wallpaper data and phone book data,
   a transfer data converter, which, in operation, converts at least one of the ringtone data, wallpaper data and phone book data included in the transfer data into a data format usable in the destination slave device, and
   a cordless phone transmitter, which in operation, transmits the converted transfer data to the destination slave device, and
the wireless IP terminal, which includes:
   a LAN receiver, which, in operation, receives from the master device the slave device information,
   which, in operation, selects the identification information of the destination slave device and selects the transfer data to be transferred to the destination slave device,
   a LAN transmitter, which, in operation, edits the transfer data to include the identification information of the destination slave device, and transmits the edited transfer data to the master device.

11. The cordless phone system according to claim 10, wherein the wireless IP terminal includes a slave device transfer data converter, which, in operation, converts at least one of the ringtone data, wallpaper data, and phone hook data included in the transfer data into the data format usable in the destination slave device.

12. A method for transferring data, comprising:
transmitting slave device information, from a coreless-phone master device via a wireless LAN to a wireless IP terminal, the slave device information including identification information of each of one or more cordless-phone slave devices registered to the master device;
receiving, at the master device from the wireless IP terminal, selection of the identification information of a destination slave device among the one or more slave devices and selection of transfer data including at least one of ringtone data, wallpaper data, and phone book data;
converting at least one of the ringtone data, wallpaper data, and phone book data included in the transfer data into a data format usable in the destination slave device; and
transmitting the converted transfer data to the destination slave device.

13. The method according to claim 12, wherein the selection of transfer data received from the wireless IP terminal is either one of: i) indication of the transfer data, or ii) the transfer data.

14. The method according to claim 12, wherein the identification information of a slave device includes at least one of a port number, an extension number, and name information of the slave device.

15. The method according to claim 12, wherein the slave device information includes i) information about the transfer data to be transferred to the slave device, and ii) conversion format information including at least information about CODEC used by the slave device.

16. The method according to claim 15, comprising converting the transfer data into the data format usable in the destination slave device according to a data type of the transfer data and the conversion format information of the destination slave device.

17. The method according to claim 16, comprising converting an audio format of the ringtone data included in the transfer data to be playable based on the CODEC used by the destination slave device.

18. The method according to claim 16, comprising converting the ringtone data included in the transfer data such that a data size of the ringtone data after the conversion is within a size of a ringtone memory of the destination slave device.

19. The method according to claim 16, comprising converting a size of the wallpaper data included in the transfer data into a wallpaper size of the destination slave device.

20. The method according to claim 16, comprising converting a thumbnail image data portion of the phone book data into a thumbnail size of the destination slave device.

* * * * *